Aug. 22, 1939.  F. R. LONG ET AL  2,170,478
VALVED PIPE UNION
Filed Jan. 11, 1938

Inventors
Fred R. Long,
F. Max Long,

Attorney

Patented Aug. 22, 1939

2,170,478

UNITED STATES PATENT OFFICE 2,170,478

VALVED PIPE UNION

Fred R. Long and Fred Max Long, Catawissa, Pa.

Application January 11, 1938, Serial No. 184,468

1 Claim. (Cl. 137—69)

This invention relates to pipe unions and more particularly to a union of heavy duty type adapted to be used in high pressure fluid lines.

A primary object of the invention is to provide a union including a valve mounted in a novel valve unit which may be readily made and finished separate from the parts of the union, and then inserted in place for use, or, on the other hand, should occasion later arise be readily removed and the union reassembled without impairing its efficiency. The parts of the union are made from forgings by machinery and may be tapped and finished as desired but ordinarily these parts do not require the care and precision necessary to the proper functioning of a valve unit. Therefore, it is desirable to make the unit separately but so constructed that it may be readily assembled in the union, or as above indicated readily removed when desired.

A further object of the invention is to provide a novel valve unit which will not chatter in opening or closing due to the fact that although the valve itself is urged to seating position by a spring, nevertheless, the action of the spring is cushioned or retarded by a dash pot arrangement so that upon the cessation of flow, or the reversal of flow in the line, the valve will gradually move to its seat thereby not only eliminating undesirable noise but at the same time increasing the wear life of the valve due to the seating taking place under cushioned or controlled spring action.

With the above and other objects in view, which will more readily appear as the nature of the invention is better understood, the same consists in the novel construction, combination and arrangements of parts hereinafter more fully described, illustrated and claimed.

A preferred and practical embodiment of the invention is shown in the accompanying drawing in which.

Figure 1:
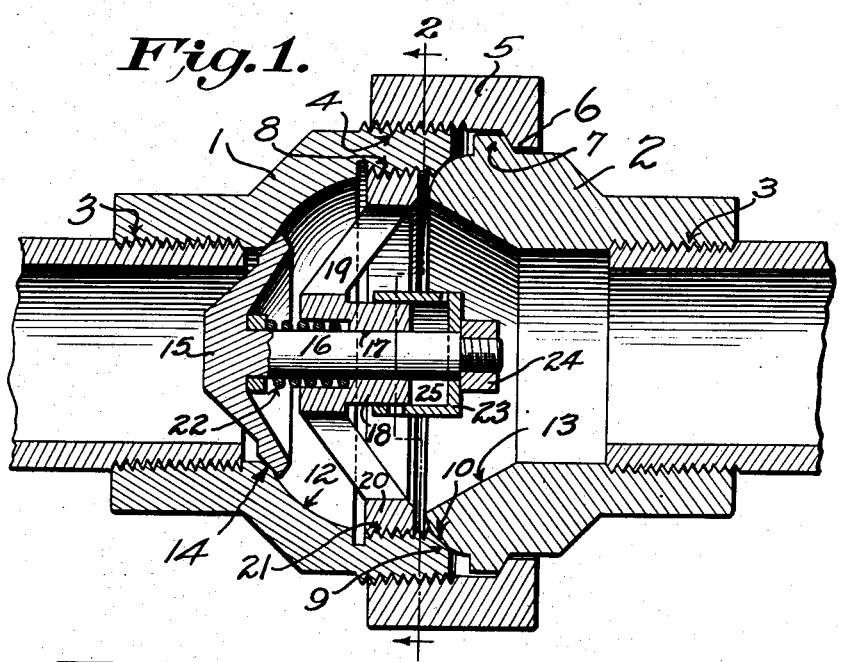
Figure 1 is a vertical sectional view of a combined pipe union and valve unit embodying the present improvements.
Figure 2:
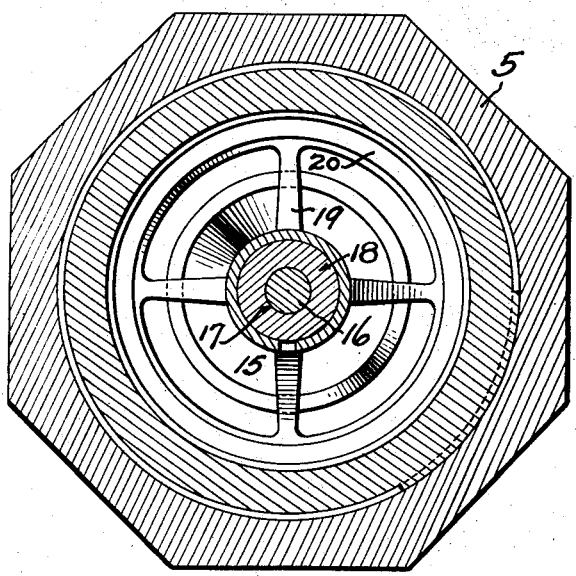
Figure 2 is a vertical sectional view taken on the line 2—2 of Figure 1.
Figure 3:
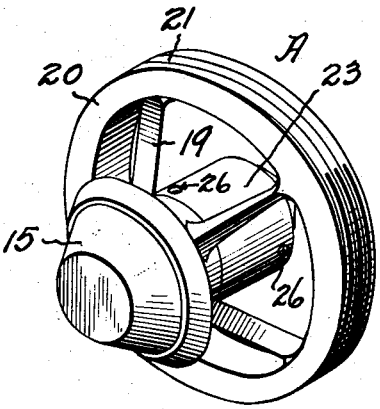
Figure 3 is a detail perspective view of the valve unit disassociated from the union.

According to the embodiment of the invention illustrated, the same includes in its organization the union sections 1 and 2 each of which are internally threaded at their opposite ends as indicated at 3 to receive the threaded portions of suitable pipe lengths. The enlarged medial portion of the section 1 is externally threaded as indicated at 4 to receive the internal threads of a coupling ring 5 which is provided with an annular shoulder 6 for engaging the annular rib 7 on the section 2. The enlarged medial portion of section 1 is also internally threaded as at 8 to receive the novel valve unit A, presently to be described, and is also provided with a beveled surface 9 at one side of the threads 8 adapted to engage with the rounded portion 10 of the section 2 when the coupling ring 5 holds the sections 1 and 2 together.

The interior surfaces of the medial portions of sections 1 and 2 are respectively bowed and flared as indicated at 12 and 13 to provide a valve chamber and also provide surfaces which will not materially impede the flow of fluid through the pipe line. Where the surface 12 of section 1 joins with the internally threaded nipple portion of the unit, it is provided a valve seat 14 cooperating with the marginal facing of a frusto-conical valve carried by the unit A.

Referring specifically to the unit A it may be pointed out that the valve 15 is provided with a stem 16 which is guided in the opening 17 of a central lug or abutment portion 18. The portion 18 is connected by arms 19 with a ring 20 externally threaded as shown at 21 for engaging with the threads 8 of the section 1. The unit A is, therefore, in the form of a spider which may be inserted in and removed from the union as desired. The lug or abutment portion 18 is recessed at the side adjacent the valve 15 to accommodate a coil spring 22 which surrounds the valve stem 16 and tends normally to urge the valve 15 toward the seat 14. The end of the valve stem 16 which projects beyond the opening 17 in the lug or abutment 18 carries therewith a cup-like piston cylinder 23 which is securely held to the valve stem 16 by a suitable fastening such as the nut 24 engaging the reduced threaded portion of the stem 16. The side wall of the cup-like piston 23 surrounds or embraces the lug or abutment 18, thereby to provide an interior fluid chamber 25, and is provided with one or more openings 26 for establishing communication between the chamber 25 and the fluid in the pipe. By varying the sides of the openings, or their number, it will be apparent that the speed with which the spring 22 may urge the valve 15 to its seat may be readily controlled. In heavy fluids larger openings or a greater number of openings may be desirable. In light fluids the openings may be less or smaller in diameter. In any event, the chamber 25 communicates with the fluid medium in the pipe line so that when the valve 15 is unseated by fluid flowing in one direction in the line the chamber 25 becomes filled with fluid, and, when flow ceases or reverses, the spring 22 will urge the valve 15 toward its seat. However, in so doing it will be understood that fluid in the chamber 25 must be more or less gradually expelled through the openings 26. In that way the movement of the valve toward its seat is cushioned.

From the foregoing it will be apparent that the present invention provides a combined union and check valve wherein the union is provided with a removable cushioned valve unit which may be inserted in one of the sections, the said unit being spring loaded and dash pot controlled. In the event that it becomes necessary to repair or replace the valve unit after a period of service, it is only necessary to uncouple the union by turning the ring 5 so as to release the sections 1 and 2. The sections may then be separated laterally and the unit A may be readily unscrewed by a spanner wrench or equivalent tool. A new unit may be inserted and the line may be quickly restored to service by replacing the coupling which again joins the sections together.

Without further description it is thought that the features and advantages will be readily apparent to those skilled in the art and it will, of course, be understood that changes in the form, proportion and details of construction may be resorted to without departing from the spirit of the invention or scope of the appended claim.

We claim:

In a pipe union comprising a pair of end sections one of which is provided with a valve seat, a valve unit including a spider having a marginal portion fitted in said end section provided with the seat and also having a central lug extending rearwardly of the valve side of the spider and provided with a guide opening, a valve including a stem having a reduced threaded end and extending through said guide opening, a spring arranged between the head of the valve and said spider for urging the said head of the valve toward said valve seat, and a perforate cup-like element having an opening and adapted to fit over the said reduced end of the valve stem, said cup-like element being slidable over the outer face of said lug to provide a fluid chamber for controlling the expansive effort of the spring in moving the valve to its seat, and a nut secured to the threaded end of the valve stem to hold said cup-like member thereto.

FRED R. LONG.
FRED MAX LONG.